United States Patent
Zhang et al.

(10) Patent No.: US 9,464,222 B2
(45) Date of Patent: Oct. 11, 2016

(54) WELL FLUID AND METHOD OF SERVICING A WELL

(75) Inventors: Jinguo Zhang, Katy, TX (US); Paul H. Javora, Spring, TX (US); Jacob Gibson, Tomball, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 695 days.

(21) Appl. No.: 13/044,192

(22) Filed: Mar. 9, 2011

(65) Prior Publication Data

US 2012/0231980 A1  Sep. 13, 2012

(51) Int. Cl.
  *C09K 8/54* (2006.01)
  *C09K 8/90* (2006.01)
  *C09K 8/68* (2006.01)
  *C09K 8/035* (2006.01)

(52) U.S. Cl.
  CPC .................... *C09K 8/035* (2013.01)

(58) Field of Classification Search
  CPC ............ C09K 8/54; C09K 8/90; C09K 8/68
  See application file for complete search history.

(56) References Cited

U.S. PATENT DOCUMENTS

| | | | |
|---|---|---|---|
| 3,764,530 A * | 10/1973 | Burland et al. ............... 507/119 |
| 4,175,042 A * | 11/1979 | Mondshine ............. C09K 8/08 166/305.1 |
| 5,246,073 A | 9/1993 | Sandiford et al. |
| 5,607,905 A * | 3/1997 | Dobson, Jr. ............. C09K 8/08 166/300 |
| 5,680,900 A * | 10/1997 | Nguyen ................. C09K 8/512 166/283 |
| 5,762,141 A * | 6/1998 | Hutchins et al. ............. 166/295 |
| 6,060,434 A | 5/2000 | Sweatman et al. |
| 2002/0055562 A1 * | 5/2002 | Butuc .................... A61K 8/042 524/80 |
| 2002/0169085 A1 | 11/2002 | Miller et al. |
| 2004/0059054 A1 * | 3/2004 | Lopez .................. E21B 36/003 525/54.3 |
| 2005/0038199 A1 | 2/2005 | Wang et al. |
| 2005/0113259 A1 * | 5/2005 | Ballard ........................ 507/100 |
| 2006/0065396 A1 | 3/2006 | Dawson et al. |
| 2006/0116296 A1 * | 6/2006 | Kippie et al. ................. 507/244 |
| 2007/0167542 A1 | 7/2007 | Lopez et al. |
| 2008/0070813 A1 * | 3/2008 | Lin et al. ....................... 507/269 |
| 2009/0082230 A1 * | 3/2009 | Javora ..................... C09K 8/04 507/269 |
| 2010/0004198 A1 * | 1/2010 | Stroumpoulis ........ A61K 8/042 514/55 |

FOREIGN PATENT DOCUMENTS

| | | |
|---|---|---|
| WO | 9500742 | 1/1995 |
| WO | 2010133258 A1 | 11/2010 |
| WO | 2011071797 A1 | 6/2011 |

OTHER PUBLICATIONS

Oil Field Chemicals, http://www.borregaard.com, retrieved Feb. 21, 2011, pp. 1-2.
Melatonin, Wikipedia, http://en.wikipedia.org/wiki/Melatonin, retrieved Jan. 21, 2011, pp. 1-19.
Galactomannan, Wikipedia, http://en.wikipedia.org/wiki/Galactomannan, retrieved Feb. 14, 2011, pp. 1-2.
Radical (chemistry), Wikipedia, http://en.wikipedia.org/wiki/Free_radical, retrieved Jun. 15, 2010, pp. 1-8.
Paul H. Javora, et al., A Decade of Experiences—The Water-Based Thermal Insulating Packer Fluid, Society of Petroleum Engineers, SPE 116769, Sep. 21, 2008, pp. 1-8.
Partial International Search dated May 7, 2012 issued in PCT/US2012/023988.
International Search Report and Written Opinion dated Jul. 10, 2012 issued in PCT/US2012/023988.

* cited by examiner

*Primary Examiner* — Jeffrey Washville
(74) *Attorney, Agent, or Firm* — Parsons Behle & Latimer

(57) ABSTRACT

A well servicing fluid for reducing polymer degradation is disclosed. The well servicing fluid is formulated with components comprising: at least one free radical scavenger, with the proviso that the free radical scavenger is not erythorbate, lignin or lignin derivatives; at least one polymer and an aqueous based solvent. Methods for servicing a well employing well servicing fluids of the present disclosure are also disclosed.

29 Claims, No Drawings

WELL FLUID AND METHOD OF SERVICING A WELL

FIELD OF THE DISCLOSURE

The present disclosure relates generally to well servicing fluids used in hydrocarbon producing wells.

BACKGROUND

Viscous brines have been used in oil fields for many purposes, including packer fluids, fluid loss control pills, fracturing fluids, as well as other applications. For many of these applications, the viscosifiers are generally water-soluble polymers. The chemical and thermal stability of these water soluble polymers can be an issue, especially for long term applications, such as packer fluids, which in some instances may function for 10 years or more.

Well fluids can be employed in various applications in which they may be subject to high temperatures. Packer fluids, for instance, are inserted into an annulus between the well tubing and well casing above a packer, in order to control pressure differentials in the wellbore. Often, the packer fluid is employed to provide good insulation properties to prevent heat loss from the production to the environment. Polymer based packer fluids are well known in the art.

Water soluble lignin and modified lignin polymers have been used by industry in a variety of applications for many years, as an inexpensive polymer. Modified lignin has been used also in the oilfield primarily as a low-cost dispersant for clay based drilling fluids, such as for example, chrome lignosulfonate, titanium or zirconium lignosulfonate. Modified Lignin-based materials have also been used as dispersants for clay based drilling fluids where chrome cannot be used, such as the lignin-based grafted synthetic polymer available from LignoTech USA, Inc., Houston, Tex., sold under the name BORRETHIN F. As such, they are known to provide temperature stability and favorably control a fluids rheological properties. Drilling fluids can also contain supplemental fluid loss control polymers, and modified lignin dispersants are known to stabilize a formulated drilling fluid's rheological and fluid loss control properties to 250° F. and higher. Lignins and lignosulfonates have also been used in oilfield cement formulations as retarders, such as the low cost calcium and sodium lignin products, MARABOND 21 and KELIG 32, both available from LignoTech USA, Houston, Tex., and as emulsifiers for oil in aqueous fluids.

Water soluble polymers, such as polysaccharides, can have limited thermal stability, especially in high-density brine under high application temperatures. A polymer in brine can be subjected to several types of degradation, including hydrolysis, oxidation and free radical degradation, etc. Erythorbate and ascorbate type chemicals, such as sodium erythorbate, have been used to prevent oxidative degradation of polymers in water based systems in order to protect and prolong polymer functionality.

While advances have been made in well fluids, further improvements would be a welcome addition in the field. In particular, it would be desirable to provide well fluids comprising polymers having improved chemical and thermal stability.

SUMMARY

An embodiment of the present disclosure is directed to a well servicing fluid for reducing polymer degradation. The well servicing fluid is formulated with components comprising: at least one free radical scavenger, with the proviso that the free radical scavenger is not erythorbate, lignin or lignin derivatives; at least one polymer and an aqueous based solvent.

Another embodiment of the present disclosure is directed to servicing a well with a well servicing fluid having reduced polymer degradation. The method comprises providing a well servicing fluid formulated with components comprising at least one free radical scavenger, at least one polymer, and an aqueous based solvent. The well servicing fluid is introduced into the well. The free radical scavenger results in reduced degradation of the polymer compared to the degradation that would occur for the same well servicing fluid without the free radical scavenger at the same temperature. The free radical scavenger is not erythorbate, lignin or lignin derivatives.

Yet another embodiment of the present disclosure is directed to a method of servicing a well with a well servicing fluid having reduced polymer degradation. The method comprises providing a well servicing fluid formulated with components comprising at least one free radical scavenger chosen from melatonin, butylated hydroxytoluene, gallic acid, salts of gallic acid, methyl gallate, lignin, lignin derivatives or hydroquinones, at least one polymer, and an aqueous based solvent. The well servicing fluid is introduced into the well. The free radical scavenger results in reduced degradation of the polymer compared to the degradation that would occur for the same well servicing fluid without the free radical scavenger at the same temperature. The well servicing fluid is not a clay-based fluid employed as a drilling fluid.

Still another embodiment is directed to a well servicing fluid for reducing polymer degradation. The well servicing fluid is formulated with components comprising: at least one free radical scavenger, wherein the free radical scavenger is not erythorbate; at least one polymer; and an aqueous based solvent. The well servicing fluid does not comprise clay in a concentration that is effective for significantly altering the viscosity of the well servicing fluid.

DETAILED DESCRIPTION

The present disclosure is directed to a well servicing fluid formulated with components comprising at least one free radical scavenger, a polymer and an aqueous based solvent. The polymer may be a viscosifying polymer, fluid loss control polymer, friction pressure control polymer, or polymer used to control other fluid properties, such as surface tension or fluid compatibility with formation rock and fluids. The formulation can optionally include polyols, water-superabsorbent polymers, pH controllers, crosslinkers and other ingredients, as will be discussed in greater detail below.

Free Radical Scavenger

The at least one free radical scavenger is employed in the compositions of the present disclosure. Any suitable free radical scavenger that is capable of reducing either the degradation of polymers or the viscous properties of the polymer in the well servicing fluid can be employed. Free radical scavengers may reduce degradation of polymers by significantly reducing the amount of free radicals available for degradation reactions; or by reducing the amount of free radicals available for reactions that lead to species that act to degrade the polymers so as to destroy or reduce their fluid properties; or by interfering with and blocking or limiting the degradation process itself. Polymer degradation can be indicated by a reduction in a fluid property, such as viscosity, fluid loss control or friction flow, with time and/or temperature.

Examples of suitable free radical scavengers can include butylated hydroxytoluene ("BHT"), gallic acid and its salts or esters, such as methyl gallate, lignin, lignin derivatives and hydroquinones and mixtures thereof. The hydroquinones can include hydroquinone and hydroquinone derivatives capable of scavenging free radicals, such as methyl ether hydroquinone ("MEHQ").

Lignin refers to naturally occurring lignin and lignin extracted by chemical processes, including processes that are well known for converting wood into pulp. Suitable lignin derivatives can be any modified lignin compound that is capable of scavenging free radicals. Examples of such lignin derivatives include, lignosulfonates, such as chrome lignosulfonates, titanium lignosulfonates, zirconium lignosulfonates or Group I or Group II metal lignosulfonates, such as the calcium and sodium lignin products, MARABOND 21 and KELIG 32, both available from Borregaard LignoTech USA, Inc. Other examples include lignin-based products grafted with synthetic polymers, such as those sold under the name BORRETHIN F or DEERES 100. The DEERES 100 product is well known in the art as a fluid loss control agent. Both BORRETHIN F and DEERES 100 are available from Borregaard LignoTech USA, Inc. In an embodiment, the free radical scavenger is not lignin or a lignin derivative.

Other derivatives of free radical scavengers capable of scavenging free radicals are also suitable. Erythorbate is another possible free radical scavenger that can be used together with one or more of the other free radical scavengers of this disclosure. In an embodiment, the free radical scavenger is not erythorbate.

Suitable free radical scavengers can also include melatonin, which provides a unique mechanism for reaction in that it is a terminating scavenger. Similar to gallates and hydroquinones, melatonin is oxidized upon reaction with a free radical. However, unlike traditional free radical scavengers, melatonin is not susceptible to redox cycling, a process which results in the subsequent release of the captured free radical. Consequently, melatonin provides a mechanism that can permanently remove active free radicals from the polymer environment.

Free radical scavengers can be used at any suitable concentrations that will provide a desired degree of protection against polymer degradation. For example, concentrations ranging from about 0.005 pound per (oilfield) barrel ("ppb") to about 1 ppb can be employed. In an embodiment, the concentration of free radical scavengers range from about 0.01 to about 0.5 pounds per barrel, such as about 0.015 to about 0.2 pounds per barrel, or from about 0.02 to about 0.05 pounds per barrel. Suitable concentrations may vary depending on the type of free radical scavengers employed, the type of brine employed, and the desired degree of protection against polymer degradation, among other things.

Polymer

The at least one polymer can be any suitable polymer that can be used to viscosify a well servicing fluid, control the friction flow of the fluid, control loss of fluid to the formation, or control another fluid property, such as surface tension or fluid compatibility with formation rock and fluids, which polymer is referred to herein as a functional polymer. In an embodiment, the viscosifying, friction flow control and/or fluid loss control polymers can be water soluble.

Examples of suitable viscosifying and/or fluid loss control polymers include crosslinkable, anionic, cationic and non-ionic polysaccharides.

Examples of polysaccharides include guar gum and derivatives thereof, such as, hydroxypropyl guar, carboxymethyl hydroxypropyl guar and its salts, guar grafted with vinyl phosphonic acid and its salts, hydroxyalkyl guar grafted with vinyl phosphonic acid and its salts, such as hydroxypropyl guar grafted with vinyl phosphonic acid. Further examples of polysaccharides include natural gums, such as xanthan gum, gellan gum, locust bean gum, welan gum, galactomannan gum, rhamsan gum, gum ghatti, gum karaya, gum tragacanth and gum arabic and derivatives thereof; starch and derivatives thereof, such as carboxymethyl starch, carboxyethyl starch, hydroxyethyl starch, hydroxypropyl starch, carboxymethyl hydroxyethyl starch, alkylcarboxyalkyl starch, alkylcarboxyalkyl hydroxyalkyl starch, methyl starch, ethyl starch, propyl starch and derivatives thereof; carrageen gum, chitan, derivatives of chitan such as chitosan, cellulose and cellulose derivatives, such as alkylcellulose, hydroxyalkyl cellulose, alkylhydroxyalkyl cellulose, carboxyalkyl cellulose derivatives, alkyl carboxyalkyl cellulose, alkyl carboxyalkyl hydroxyalkyl cellulose. Other examples of the cellulose derivatives include methyl cellulose, ethyl cellulose, propyl cellulose, hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethyl cellulose, carboxymethyl cellulose and carboxymethyl hydroxyethyl cellulose. Derivatives of any of the above celluloses can also be used, including hydroxyalkylcellulose grafted with vinyl phosphonic acid and its salts, such as hydroxyethylcellulose or hydroxypropylcellulose grafted with vinyl phosphonic acid and salts thereof. The polysaccharides can be microbial polysaccharides such as xanthan gum, diutan gum, welan gum, gellan gum and rhamsan gum, mentioned above, as well as succinoglycan and scleroglucan, and derivatives thereof.

Other examples of suitable polymers include polyvinyl alcohol, polyimide, polyamine, quaternary polyamine, quaternary ammonium polymer, polyacrylate, polypyrrolidone, polyacrylamide and mixtures thereof. In addition, the functional polymer of the invention may be a block or random copolymer containing units selected from vinyl alcohol, acrylates, including the (meth)acrylates, pyrrolidone, 2-acrylamido-2-methylpropane sulfonate and acrylamide including the (meth)acrylamides.

Viscosifying polymers can have any suitable concentration in the well servicing fluid. An example of a suitable range of concentrations is from about 1 to about 10 pounds per (oilfield) barrel ("ppb"), preferably from about 2 to about 6 ppb. In a thermal insulating composition, the viscosifier is included in the fluids to provide a base viscosity to the fluid and/or to reduce the convection flow velocity of the fluid within the annulus, thereby improving the thermal insulation efficiency of the fluid. Fluid loss control polymers can also have any suitable concentration. An example of a suitable range of concentrations for fluid loss control polymer is from about 1 to about 10 ppb, such as about 2 to about 6 ppb. Polymers used to control the friction flow of the fluid can also have any suitable concentration. An example of a suitable range of concentrations for controlling fluid friction flow is from about 0.01 to about 1 ppb, such as from about 0.05 to 0.5 ppb.

Aqueous Based Solvent

Any aqueous based solvent suitable for use in well servicing fluids can be employed. In an embodiment, the aqueous based solvent is chosen from fresh water, brine, seawater and produced water.

The brine may be any brine that serves as a suitable media for the various components. As a matter of convenience, in some cases the brine base fluid may be the brine available at the site used in the completion fluid, for example. In an embodiment, the aqueous based solvent can be a completion or workover brine.

The brines may be prepared using at least one salt such as, but not limited to, NaCl, KCl, $CaCl_2$, $MgCl_2$, $NH_4Cl$, KBr, $CaBr_2$, NaBr, $ZnBr_2$, sodium formate, potassium formate, cesium formate, sodium acetate, potassium acetate, cesium acetate, and mixtures thereof, and any other stimulation and completion brine salts. In an embodiment, the brine is calcium bromide based brine that includes substantially no chloride salts. Such salts are well known for use in subsea and land based hydrocarbon wells. An example of a well known commercially available bromide based brine is HYCAL® II SB, available from BJ Services Company, U.S.A., of Houston, Tex. The brine may be a combination of one or more of the mentioned salts, such as, for example, a brine prepared using KCl, NaCl and NaBr, NaCl and $CaCl_2$, or $CaCl_2$ and $CaBr_2$.

The concentration of the salt in the brines can range from about 500 milligrams per liter (mg/L), up to saturation for a given salt. Example concentration of salts include 2%, 10%, 20%, 30%, 75% or more salt by weight of brine. For example, a high density brine can have total salt concentrations ranging from about 40% to 75% or more. In an embodiment, the brine can have a density ranging from about 8.4 to about 20 pounds per gallon, or more.

In an embodiment, the density of the brine is greater than about 11.6 pounds per gallon (1.39 grams per milliliter) and contains sodium, calcium and/or zinc bromide salt, or sodium and/or potassium and/or cesium formate or acetate salt. Examples of high-density aqueous based solvents include, but are not limited to, 12.5 pounds per gallon $CaCl_2/CaBr_2$ brine (1.50 grams per milliliter), 14.2 pounds per gallon $CaBr_2$ brine (1.70 grams per milliliter), and 17.6 pounds per gallon $CaCl_2/CaBr_2/ZnBr_2$ brine (2.11 grams per milliliter).

The concentration of aqueous based solvent in the well servicing fluid can be any suitable concentration. For example, the concentration can range from about 1% to less than 100% by weight, such as about 10% by weight or more, based on the total weight of the well servicing fluid. In an embodiment, the concentration of aqueous based solvent, such as brine, is at least 50% by weight, based on the total weight of the well servicing fluid, such as about 75% or 85% by weight or more.

Polyols

The composition of the invention may further include a polyol as a solvent. Such solvents are of assistance in keeping the functional polymer of this disclosure dispersed and hydrated in the composition and to prevent or reduce polymer decomposition while being subjected to the high temperature conditions encountered in hotter wellbores. In addition, the polyol serves to reduce the thermal conductivity of the composition and thus imparts thermal insulation to the composition. It can also help control the crystallization point of the fluid, control hydrates and reduce the amount of water in the system. In an embodiment, the functional polymer is introduced to the polyol and the resulting slurry is then added to the brine containing one or more free radical scavengers and other additives such as buffers, corrosion inhibitors and crosslinking agents, if present.

The polyol can be a glycerol, a glycol or a polyglycol and mixtures thereof. The glycols include commonly known glycols such as ethylene glycol, propylene glycol and butylene glycol. The polyglycols can be selected from a wide range of known polymeric polyols that include polyethylene glycol, poly(1,3-propanediol), poly(1,2-propanediol), poly(1,2-butanediol), poly(1,3-butanediol), poly(1,4-butanediol), poly(2,3-butanediol), co-polymers, block polymers and mixtures of these polymers. A wide variety of polyglycols are commercially available. Most commercially available polyglycols include polyethylene glycol, and are usually designated by a number that roughly corresponds to the average molecular weight. Examples of useful commercially available polyethylene glycols include polyethylene glycol 400 and polyethylene glycol 8000, both of which are available from ScienceLab.com, Inc., of Houston, Tex. Preferably the polymeric polyols for use in the compositions of the present disclosure are selected to have a number average molecular weight, Mn, of about 150 to about 18,000 Daltons. For example, the polymeric polyols can be selected to have a number average molecular weight of about 190 to about 10,000 D, such as a number average molecular weight of about 500 to about 8,000 D. When present, the compositions of the present disclosure can contain, for example, from about 10 to about 99 wt % of polyol.

Use of glycols or polyglycols having the described number average molecular weight in the present disclosure may provide a fluid that exhibits stable rheological properties especially at elevated temperatures and over extended periods of time. These glycols and polyglycols are particularly well suited for deep wellbores that exert high temperature and pressures on fluids.

The fluids of the present disclosure may include clay or clay-like materials or other materials that aid in imparting desired fluid properties, such as viscosity and/or fluid loss control, to the composition. Such materials may, for example, be used in addition to the viscosifying and/or fluid loss control agents referenced above. The polyol solvent, in such circumstances, is compatible with such materials.

Water-Superabsorbent Polymer

In an embodiment, a water-superabsorbent polymer can be employed in the well servicing fluids of the present disclosure. The water-superabsorbent polymer improves the thermal insulation efficiency of the fluid by immobilizing water molecules. As used herein, the term "water-superabsorbent polymer" defines a polymer capable in its dry state of absorbing and retaining a minimum of its own weight in water. In a preferred embodiment, the water-superabsorbent polymer is capable of absorbing a minimum of 20, preferably 100, more preferably 700, and most preferably 1,000, times its own weight in water (e.g., 20 g to about 1,000 g of water absorbed per gram of absorbent polymer). In some instances, the superabsorbent polymer may have a water-absorbing capacity up to 2,000 times its own weight and, in other instances, about 1,500 times its own weight. Such water-absorbing properties are defined under normal conditions of temperature (25° C.) and pressure (760 mm Hg, i.e., 100,000 Pa) and generally for distilled water.

After absorption of the aqueous fluid, the particles of the polymer thus impregnated with aqueous fluid may retain their individual particulate state or remain dispersed in the aqueous fluid. The water-superabsorbent polymer may be in the form of particles, fibers, beads, a liquid or a paste. As a bead or solid particulate, the water-superabsorbent polymer may be a water swellable particle having a mean size of, for example, less than 20 mm.

Examples of water-superabsorbent polymer materials include: starch-grafted polyacrylates; acrylamide/acrylic acid copolymers, including sodium salts of such polymers; starch-grafted acrylamide/acrylic acid, including sodium and potassium salts of such polymers; starch-acrylonitrile graft copolymers; homopolymers of polyacrylonitrile; isobutylene/maleic anhydride copolymers; sodium and potassium salts of carboxymethylcellulose; and chitosan/polyvinylpyrrolidone and chitosan/polyethyleneimine combinations.

Examples of commercially available water-superabsorbent polymers include: crosslinked sodium or potassium polyacrylates, sold under the names SALSORB™ CL10, SALSORB™ CL20, "FSA type 101," and "FSA type 102," by the company Allied Colloids, ARASORB™ S-310, from Arakawa Chemical, "ASAP 2000™" and ARIDALL™ 1460, from Chemdal, "KI-gel 201K," from Siber Hegner, AQUALIC® CA W3, AQUALIC® CA W7, and AQUALIC® CA W10, from Nippon Shokubai, AQUA KEEP® D 50, AQUA KEEP® D 60, AQUA KEEP® D 65, AQUA KEEP® S 30, AQUA KEEP® S 35, AQUA KEEP® S 45, AQUA KEEP® A1 M1, and AQUA KEEP® A1 M3, from Atochem, and SANWET® IM-5000D, from Hoechst Celanese; starch-grafted polyacrylates, sold under the names SANWET® IM-100, SANWET® IM-3900, and SANWET® IM-50005, from Hoechst; starch-grafted acrylamide/acrylic acid copolymers, in the form of the sodium or potassium salt, sold under the names WATER LOCK® A-100, WATER LOCK® A-200, WATER LOCK® D-200, and WATER LOCK® B-204, from Grain Processing Corporation; acrylamide/acrylic acid copolymers, in the form of the sodium salt, sold under the name WATER LOCK® G-400, from Grain Processing Corporation; isobutylene/maleic anhydride copolymer, sold under the name "KI Gel-201 K"; carboxymethylcellulose, sold under the name AQUASORB® A250, from Aqualon; and chitosan/polyvinylpyrrolidone combinations, sold under the name "Hydrogel AQUATRIX® 2," and chitosan/polyethyleneimine combinations, sold under the name "Hydrogel AQUATRIX® 3," from Hydromer.

In an embodiment, the superabsorbent polymers employed in the formulation are chosen from those sold by Grain Processing Corporation, Muscatine, Iowa, under the trademark WATER LOCK® Superabsorbent Polymer, such as the WATER LOCK® G-400 series, which is a homopolymer material classed as a Poly(2-propenamide-co-2-propenoic acid, sodium or potassium salt); or the WATER LOCK® G-504 polymers, which are classed as Poly((2-propenamide-co-2-propenoic acid, sodium salt). These and other superabsorbent polymers are disclosed in U.S. Patent Application Publication No. 2004/0059054, the disclosure of which is hereby incorporated by reference in its entirety.

The water-superabsorbent polymer may be present in the inventive compositions in any suitable amount. Exemplary amounts range from about 0.05 to about 10% by weight, relative to the total weight of the composition, such as from about 0.2 to about 5% by weight.

pH Controller

A pH controller can optionally be used to raise or lower the pH as desired. For example, some viscosifying polymers may gel at certain pH ranges to provide a desired viscosity. The pH controller can be a buffer that is employed to maintain a desired pH within a given range. Any suitable pH controller capable of achieving or maintaining a workable pH can be employed. Suitable pH controllers can include NaOH, KOH, $Ca(OH)_2$, sodium bicarbonate, potassium carbonate, and sodium carbonate ($Na_2CO_3$). The desired pH of the fluid may depend on a number of factors, including the type of aqueous base fluid or other ingredients employed in the formulation and the application for which the formulation is intended. Thus, any suitable pH range can be employed, including acidic, neutral and basic pH ranges.

Crosslinkers

Some functional polymers of the well servicing fluids of the present disclosure can be crosslinked, including but not limited to, hydroxypropyl guar, carboxymethyl hydroxypropyl guar, carboxymethylhydroxyethyl cellulose and vinylphosphonic acid derivatives of hydroxyethylcellulose and their salts.

Where the functional polymers are to be crosslinked, the well servicing fluids contain a crosslinker. In some instances the crosslinker can allow for delayed viscosification by delaying the crosslinking of the polymer. Examples of suitable crosslinkers include, but are not limited to, magnesium, calcium, iron, aluminum, titanium, zirconium and other water soluble or dispersible transition metal species. Other examples of suitable crosslinkers include crosslinking metal-releasing agents, such as those disclosed in U.S. Patent Application Publication No. 2004/0059054, the description of which is hereby incorporated by reference in its entirety.

Other Ingredients

One or more additional compounds can be included in the well servicing fluids of the present disclosure. The well servicing fluid can comprise, for example, at least one additional compound chosen from breakers capable of reducing the viscosity of the fluid, surfactants, non-emulsifiers, additional viscosifying agents, clay stabilization additives, scale dissolvers, biopolymer degradation additives, fluid loss control additives, biocides, high temperature stabilizers, and other common and/or optional components.

In an embodiment, clay can be employed as a viscosifying agent in the fluids of the present disclosure, as is well known in the art. In an alternative embodiment, clay, such as bentonite, is not employed in concentrations sufficient to significantly alter the viscosity of the well servicing fluid. Some fluids may include only trace concentrations of clay, clay introduced from the wellbore itself, or none at all.

If the well servicing fluid is to be used as a fracturing fluid, proppants can be included in the formulation. Any suitable proppant can be employed. Examples of suitable proppant include graded sand, glass or ceramic beads or particles, bauxite grains, resin coated sand, walnut shell fragments, aluminum pellets, nylon pellets, and combinations of the above. Furthermore, the propants can be coated or impregnated with resins and other chemicals. Proppants are well known to be used in concentrations ranging from about 0.05 to about 14 pounds per gallon (about 6 to about 1700 $kg/m^3$) of fracturing fluid composition, but higher or lower concentrations can be used as desired for the particular fracturing design.

In addition, the formulations of the present disclosure can also include corrosion inhibitors. Any suitable corrosion inhibitors can be employed. Examples of suitable corrosion inhibitors include sodium erythorbate and the commercially available corrosion inhibitor HTI-2001, available from BJ Services Company, U.S.A., of Houston, Tex.

The present disclosure is also directed to a method of servicing a well using any of the well servicing fluids described herein. The method comprises providing a well servicing fluid formulated with components comprising at least one free radical scavenger, a polymer and an aqueous based solvent. The well servicing fluid can be introduced into the well by pumping the fluid through tubulars, such as an annulus, production tubing or other well conduit. The polymer can be a viscosifying polymer, fluid loss control polymer, a polymer for controlling fluid friction flow or other polymer, as discussed herein above.

In an embodiment, the well servicing fluid is employed as a completion packer fluid. The packer fluid can be introduced into the annulus between the well tubing and well casing above a packer in order to control pressure within the wellbore annulus and/or provide thermal insulation. In another embodiment the fluid is a riser fluid introduced into, for example, a riser annulus.

Still other types of applications for which the well servicing fluids of the present disclosure can be used include insulating fluids, polymer based fluid loss control pills, viscosifed brines for drilling or drill-in applications, drill-in fluids, drilling fluids, diverting fluids, and stimulation fluids comprising polymers.

In an embodiment of the present disclosure, the fluid can be employed as a polymer-based drilling fluid. Polymer based drilling fluids are generally aqueous based. In addition to water and one or more of the free radical scavengers discussed herein, they can include a polymer, which may be, for example, a synthetic polymer such as polyacrylate or partially hydrolyzed polyacrylamide; a pH controlling agent, such as caustic or a buffer; a supplemental fluid loss control agent, which may be, for example, a carbohydrate such as starch; and an additive for increasing the density of the fluid, such as barite.

In an embodiment of the present disclosure, the fluid can be employed as a drill-in fluid. Drill-in fluids can comprise one or more of the free radical scavengers discussed herein, a brine, a polymer such as xanthan gum, hydroxypropyl guar, hydroxypropyl carboxymethyl guar, sclerogucan, succinoglycan, polyacrylate and polyacrylamides, such as partially hydrolyzed polyacrylamide; a pH controlling agent, such as caustic or a buffer, and a supplemental fluid loss control agent, which may be, for example, a carbohydrate, such as starch.

In an embodiment, the well servicing fluids can be maintained in the well at relatively high temperatures for extended periods of time. For example, the well fluids can be maintained in the well for a year or more, or 10 years or more, at temperatures above about 140° F., such as about 160° F. or higher. Application temperatures for well servicing fluids containing a free radical scavenger can be increased while achieving reduced or similar polymer degradation compared to the same well servicing fluids without the free radical scavengers over the same period of time. For example, application temperatures for a viscous brine containing a free radical scavenger can be increased by about 10° F. to about 20° F. or more, compared to the application temperature of the same viscous brine without the free radical scavenger. The free radical scavenger results in reduced degradation of polymers used in well servicing fluids, such as friction flow control polymers, viscosifying polymers and/or fluid loss control polymers, compared to the degradation that would occur for the same well servicing fluid without the free radical scavenger, at the same temperature.

The present disclosure will be further described with respect to the following Examples, which are not meant to limit the invention, but rather to further illustrate the various embodiments.

EXAMPLES

Experiments 1 to 4 below were performed to determine the effectiveness of various free radical scavengers, including erythorbate, gallic acid, methylether hydroquinone (MEHQ), melatonin and butylated hydroxytoluene (BHT), for increasing the lifetime of well servicing fluids through reducing and/or negating harmful free radical reactions.

A first Base Insulating Fluid (BIF1) for Experiments 1 to 4 was prepared by mixing 4 grams of carboxy methyl hydroxypropyl guar and 2 grams of WATER LOCK® G504, manufactured by Grain Processing Corporation of Muscatine, Iowa, into 87.5 mL propylene glycol. This mixture was added to 213.5 mL DI Water and 49 mL of 12.5 pound per gallon sodium bromide, and mixed until the polymers yielded maximum viscosity. The pH for the BIF1 was then adjusted by adding 0.25 mL 50% potassium carbonate solution.

For Experiment 5, below, a second Base Insulating Fluid ("BIF2") was prepared that was similar to BHF1, except that the pH was adjusted by adding 0.5 mL of 50% potassium carbonate solution, instead of the 0.25 mL of 50% potassium carbonate solution added to BHF1.

For Experiment 6, below, a third Base Insulating Fluid ("BIF3") was prepared that was similar to BHF1, except that the pH was adjusted by adding 1.25 grams sodium carbonate, instead of the 0.25 mL of 50% potassium carbonate solution added to BHF1.

For Experiment 7, below, a fourth Base Insulating Fluid ("BIF4") was prepared that was similar to BHF1, except that the 4 grams of carboxy methyl hydroxypropyl guar was replaced with 2.5 grams xanthan gum (Xanvis™, available from C.P. Kelco U.S., Inc., of Atlanta, Ga.), and the pH of BIF4 was adjusted with 1.25 grams sodium carbonate.

Potassium peroxydisulfate (KPS), which is known to undergo thermal decomposition at temperatures as low as 100° F. resulting in the generation of free radical species, was employed as a source of free radicals. In Experiments 1 to 4 below, KPS was introduced to the first Base Insulating Fluid (BIF1) formulation and incubated at 180° F. (representative temperature for a downhole environment). Viscosity was measured using a Fann35 viscometer, with degradation of polymeric material being determined by a reduction in viscosity or the directly measured Fann Dial Reading. The following sets of experiments were carried out:

Experiment 1

Determining the Degradation Baseline

Experiment 1 focused on the ability of KPS to initiate free radicals and induce a significant amount of BIF degradation. 0.24 g of KPS were added to 240 mL of the BIF1 formulation (0.1 g KPS per 100 mL of insulating gel product) and incubated at 180° F. At specific time points, the samples were cooled to 75-77° F. and the viscosity was measured. Initial viscosity values were reported as Fann Dial Readings ("FDR").

TABLE 1

Baseline Data

| Fann rpm | Initial Fann Dial Reading | Fann Dial Reading at 4 hours | Fann Dial Reading at 24 hours |
|---|---|---|---|
| 3 | 81 | 14 | 14 |
| 6 | 97 | 24 | 23 |
| 100 | 186 | 114 | 115 |
| 200 | 220 | 154 | 156 |
| 300 | 244 | 186 | 190 |
| 600 | 293 | 244 | 255 |

The left column lists the 6 rpm settings at which viscosity of the BIF1 formulation with the addition of 0.24 g of KPS radical initiator was measured. The values to the right represent the viscosity of the BIF1 formulation with the addition of 0.24 g of KPS radical initiator reported as Fann Dial Readings at the initial time, and after 4 hours and 24 hours. After only 4 hours, a significant reduction in viscosity, reported as Fann Dial Readings, was observed. Apparently, a majority of the polymer degradation occurred by 4 hours, as there is generally little additional reduction in viscosity observed at 24 hours.

Experiment 2

Measuring the Inhibitive Effects of Each Scavenger Individually

Having established the baseline for polymer degradation caused by KPS alone, each scavenger was added to the BIF1 formulation prior to the addition of 0.1 g KPS per 100 mL of insulating gel product. Only a 0.35 molar equivalent of scavengers were used with respect to KPS to ensure that some degradation could take place. The viscosity data for each scavenger tested is reported as Fann Dial Readings in TABLES 2 to 6 below.

TABLE 2

Sample Containing Erythorbate As The Scavenger.

| Fann rpm | Initial Fann Dial Reading | Fann Dial Reading at 4 hours. | Fann Dial Reading at 24 hours |
|---|---|---|---|
| 3 | 80 | 31 | 29 |
| 6 | 96 | 45 | 43 |
| 100 | 185 | 139 | 140 |
| 200 | 219 | 175 | 179 |
| 300 | 242 | 202 | 206 |
| 600 | 298 | 252 | 263 |

TABLE 3

Sample Containing BHT As The Scavenger

| Fann rpm | Initial Fann Dial Reading | Fann Dial Reading at 4 hours | Fann Dial Reading at 24 hours |
|---|---|---|---|
| 3 | 92 | 28 | 25 |
| 6 | 111 | 42 | 39 |
| 100 | 209 | 148 | 145 |
| 200 | 244 | 190 | 187 |
| 300 | 273 | 220 | 215 |
| 600 | OL | 278 | 275 |

OL—Over Limit, or >312

TABLE 4

Sample Containing Melatonin As The Scavenger

| Fann rpm | Initial Fann Dial Reading | Fann Dial Reading at 4 hours | Fann Dial Reading at 24 hours |
|---|---|---|---|
| 3 | 93 | 83 | 78 |
| 6 | 111 | 102 | 96 |
| 100 | 197 | 199 | 195 |
| 200 | 242 | 236 | 232 |
| 300 | 273 | 261 | 259 |
| 600 | OL | OL | OL |

OL—Over Limit, or >300

TABLE 5

Sample Containing Gallic Acid As The Scavenger

| Fann rpm | Initial Fann Dial Reading | Fann Dial Reading at 4 hours | Fann Dial Reading at 24 hours |
|---|---|---|---|
| 3 | 80 | 71 | 67 |
| 6 | 97 | 87 | 84 |
| 100 | 186 | 177 | 178 |
| 200 | 221 | 210 | 214 |
| 300 | 246 | 235 | 235 |
| 600 | 298 | 285 | 293 |

TABLE 6

Sample Containing MEHQ As The Scavenger

| Fann rpm | Initial Fann Dial Reading | Fann Dial Reading at 4 hours | Fann Dial Reading at 24 hours |
|---|---|---|---|
| 3 | 91 | 80 | 75 |
| 6 | 110 | 99 | 94 |
| 100 | 208 | 199 | 197 |
| 200 | 245 | 235 | 234 |
| 300 | 268 | 259 | 258 |
| 600 | OL | OL | OL |

OL—Over Limit, or >300

The above experiments demonstrate that both erythorbate and BHT provide only minor protection against free radical degradation caused by the presence of KPS. However, remaining scavengers melatonin, gallic acid and MEHQ all demonstrate an increased ability to reduce free radical degradation. It should be noted that the radical initiator, KPS, was in a molar excess in each experiment. As a result, it is believed that the protective qualities associated with the scavengers may be greater than might be readily apparent from the data generated by these experiments, as there is significantly more free radical generator present than free radical scavenger.

Experiment 3

Measuring the Inhibitive Effects of 50:50 Mixtures

50:50 by molar equivalent mixtures of erythorbate and one of BHT, melatonin, gallic acid and MEHQ were prepared. The total amount of scavenger mixture was formulated such that a molar ratio of 0.35 (i.e. 0.175 mole equivalents of scavenger A and 0.175 mole equivalents of scavenger B) was prepared with respect to KPS, ensuring that substantially the same excess of radical initiator, KPS, was maintained as in Experiment 2. Viscosities were measured and the resulting data reported as Fann Dial Readings is shown below.

TABLE 7

50:50 By Molar Equivalent Mixture Of Erythorbate And BHT

| Fann rpm | Initial Fann Dial Reading | Fann Dial Reading at 4 hours | Fann Dial Reading at 24 hours |
|---|---|---|---|
| 3 | 105 | 47 | 42 |
| 6 | 127 | 66 | 61 |
| 100 | 230 | 184 | 181 |
| 200 | 268 | 228 | 225 |
| 300 | 285 | 256 | 254 |
| 600 | OL | OL | OL |

OL—Over Limit, or >300

TABLE 8

50:50 By Molar Equivalent Mixture Of Erythorbate And Melatonin

| Fann rpm | Initial Fann Dial Reading | Fann Dial Reading at 4 hours | Fann Dial Reading at 24 hours |
|---|---|---|---|
| 3 | 97 | 89 | 80 |
| 6 | 118 | 111 | 101 |
| 100 | 220 | 213 | 208 |
| 200 | 256 | 251 | 246 |
| 300 | 286 | 279 | 272 |
| 600 | OL | OL | OL |

OL—Over Limit, or >300

TABLE 9

50:50 By Molar Equivalent Mixture Of Erythorbate And Gallic Acid

| Fann rpm | Initial Fann Dial Reading | Fann Dial Reading at 4 hours | Fann Dial Reading at 24 hours |
|---|---|---|---|
| 3 | 91 | 83 | 75 |
| 6 | 110 | 104 | 95 |
| 100 | 210 | 204 | 198 |
| 200 | 244 | 241 | 236 |
| 300 | 269 | 266 | 261 |
| 600 | OL | OL | OL |

OL—Over Limit, or >300

TABLE 10

50:50 By Molar Equivalent Mixture Of Erythorbate And MEHQ

| Fann rpm | Initial Fann Dial Reading | Fann Dial Reading at 4 hours | Fann Dial Reading at 24 hours |
|---|---|---|---|
| 3 | 108 | 98 | 89 |
| 6 | 130 | 120 | 112 |
| 100 | 235 | 231 | 227 |
| 200 | 274 | 268 | 262 |
| 300 | 300 | 290 | 291 |
| 600 | OL | OL | OL |

OL—Over Limit, or >300

Again, it was observed that samples containing BHT only demonstrated a minor ability to inhibit free radical degradation. It was therefore determined that BHT is not as good a candidate as the remaining scavengers. However, BHT may still be useful as it may have other advantages/desirable characteristics that were not investigated in this study (i.e. anticorrosive effects, etc.).

Interestingly, the 50:50 molar equivalent mixtures of erythorbate and gallic acid, melatonin and MEHQ all exhibit scavenging capabilities comparable to gallic acid, melatonin and MEHQ tested independently, suggesting some amount of a synergistic relationship to erythorbate (i.e. the mixture of the two is more potent than the combination of their individual contributions). This may be beneficial, as it can be favorable to only add a small amount of an additional scavenger to achieve similar protective characteristics.

Experiment 4

80:20 a by Molar Equivalent Mixtures of Scavengers

Experiment 4 was carried out using mixtures similar to those of Experiment 3 above, except that mixtures having an 80:20 molar ratio of erythorbate and the remaining scavengers were used (i.e. 0.28 mole equivalents of erythorbate and 0.07 mole equivalents of additional scavenger). Viscosity data was collected and is reported as Fann Dial Readings below.

TABLE 11

80:20 By Molar Equivalent Mixture Of Erythorbate And Melatonin

| Fann rpm | Initial Fann Dial Reading | Fann Dial Reading at 4 hours | Fann Dial Reading at 24 hours | Fann Dial Reading at 48 hours |
|---|---|---|---|---|
| 3 | 92 | 79 | 72 | 60 |
| 6 | 112 | 98 | 93 | 80 |
| 100 | 210 | 202 | 202 | 189 |
| 200 | 247 | 236 | 237 | 228 |
| 300 | 275 | 262 | 265 | 256 |
| 600 | OL | OL | OL | OL |

OL—Over Limit, or >300

TABLE 12

80:20 By Molar Equivalent Mixture Of Erythorbate and Gallic Acid

| Fann rpm | Initial Fann Dial Reading | Fann Dial Reading at 4 hours | Fann Dial Reading at 24 hours | Fann Dial Reading at 48 hours |
|---|---|---|---|---|
| 3 | 94 | 82 | 78 | 72 |
| 6 | 114 | 103 | 98 | 93 |
| 100 | 214 | 208 | 209 | 206 |
| 200 | 250 | 246 | 248 | 246 |
| 300 | 276 | 272 | 274 | 275 |
| 600 | OL | OL | OL | OL |

OL—Over Limit, or >300

TABLE 13

80:20 By Molar Equivalent Mixture Of Erythorbate And MEHQ

| Fann rpm | Initial Fann Dial Reading | Fann Dial Reading at 4 hours | Fann Dial Reading at 24 hours | Fann Dial Reading at 48 hours |
|---|---|---|---|---|
| 3 | 90 | 81 | 68 | 60 |
| 6 | 110 | 101 | 89 | 81 |
| 100 | 209 | 207 | 201 | 196 |
| 200 | 245 | 247 | 241 | 236 |
| 300 | 270 | 274 | 270 | 265 |
| 600 | OL | OL | OL | OL |

OL—Over Limit, or >300

The results of Experiment 4 were expected to more closely resemble the results of testing erythorbate alone, as erythorbate comprised 80% of the scavengers present in the mixtures tested. Thus, it was surprising to see that the inhibitive effects observed were closer to the results of testing the melatonin, gallic acid and MEHQ alone, as these components only made up 20% of the scavengers present. Based on these results, it is concluded that there is a synergistic effect towards radical scavenging when adding a small amount of these potent scavengers to erythorbate.

Overall Summary of Experiments 1 to 4

Based on the data above, it was determined that erythorbate demonstrates very little ability to prevent free radical degradation when used alone. It was also determined that BHT demonstrates relatively little ability to inhibit free radical degradation, but may have other attractive qualities not studied here. On the other hand, melatonin, gallic acid and MEHQ were all determined to be excellent free radical scavengers when used alone. Interestingly, the addition of a minimal amount of melatonin, gallic acid and/or MEHQ with erythorbate exhibited free radical inhibition comparable to that observed for the compositions tested with melatonin, gallic acid and MEHQ alone, suggesting a synergistic effect resulting from the mixture of the two. While erythorbate does not demonstrate an increased ability to inhibit free radical reactions, the slight addition of melatonin, gallic acid and/or MEHQ greatly increases this inhibition. The presence of both the erythorbate and the very minimal amounts of melatonin, gallic acid and/or MEHQ provided excellent prevention of free radical degradation caused by KPS.

Experiment 5

Determining the Long-Term Effect of a Large Dose of Erythorbate on BIF2

A 350 mL batch of BIF2 was prepared and treated with 0.15 grams of erythorbate, which is a higher concentration of erythorbate than would typically be used. The initial rheology was measured at 75-77° F. and then the sample was heat aged in a sealed vessel at 180° F. for 90 days. After cooling the sample to 75-77° F., its rheology was again measured. Initial and final viscosity values were reported as Fann Dial Readings.

TABLE 14

| BIF2 Formula Containing 0.15 Pounds Per Barrel Erythorbate | | |
| --- | --- | --- |
| Fann rpm | Initial Fann Dial Reading | Fann Dial Reading at 90 Days |
| 3 | 64 | 46 |
| 6 | — | 60 |
| 10 | 94 | 76 |
| 100 | 171 | 158 |
| 200 | 190 | 189 |
| 300 | 187 | 187 |
| 600 | 192 | 194 |

The results indicated that despite the use of erythorbate as an oxygen scavenger, the presence of the large quantity of erythorbate did not prevent polymer degradation. This further highlights the benefits of the free radical scavengers described herein.

Experiment 6

Determining the Effect of Free Radical Scavengers on the Stability of BIF3

A 350 ml batch of the BIF3 formulation was prepared, as described above, and treated with the free radical scavengers listed in TABLE 15. The samples were split and one set was heat aged at 180° F. and another set was heat aged at 200° F., for 105 and 100 days respectively, in sealed vessels. The samples were cooled to 75-77° F. and gel quality was measured qualitatively on a scale of 1 to 4, with No. 1 representing good quality gel and No. 4 representing poor quality gel. The results are listed in TABLE 15.

TABLE 15

| Stability of BIF3 with free radical scavengers at 180 and 200° F. | | | | | | | | |
| --- | --- | --- | --- | --- | --- | --- | --- | --- |
| | 180 F./105 days | | | | 200 F./100 days | | | |
| Formulation | OFB1 | OFB2 | OFB3 | OFB4 | OFB1 | OFB2 | OFB3 | OFB4 |
| Gel Quality | No. 1 | No. 1 | No. 1 | No. 1 | No. 1 | No. 1 | No. 1 | No. 1 |
| Erythorbate, gram | 0.025 | 0.025 | — | — | 0.025 | 0.025 | — | — |
| BHT, gram | 0.035 | — | 0.035 | — | 0.035 | — | 0.035 | — |
| MEHQ, gram | — | 0.020 | — | 0.020 | — | 0.020 | — | 0.020 |

The results clearly indicate that the free radical scavengers tested either alone or in conjunction with erythorbate performed excellently, as was expected for these applications.

Experiment 7

Determining the Effect of Free Radical Scavengers on the Stability of a Microbial Polysaccharide-Based BIF4

A 350 ml batch of microbial polysaccharide-based BIF4 was prepared, as described above, and treated with the free radical scavengers listed in Table 16. The samples were split into two sets. One set was heat aged at 200° F. and another set was heat aged at 240° F., each for 100 days in sealed vessels. The samples were cooled to 75-77° F. and gel quality was measured qualitatively on a scale of 1 to 4, with No. 1 representing good quality gel and No. 4 representing poor quality gel. The results are listed in TABLE 16.

TABLE 16

Microbial polysaccharide-based BIF4 stability at 200 and 240° F.

| Formulation | 200° F./100 days | | | | 240° F./100 days | | | |
| --- | --- | --- | --- | --- | --- | --- | --- | --- |
| | OFB5 | OFB6 | OFB7 | OFB8 | OFB5 | OFB6 | OFB7 | OFB8 |
| Gel Quality | No. 2 | No. 1 | No. 4 | No. 1 | No. 2 | No. 3 | No. 4 | No. 1 |
| Erythorbate, gram | 0.025 | 0.025 | — | — | 0.025 | 0.025 | — | — |
| BHT, gram | 0.035 | — | 0.035 | — | 0.035 | — | 0.035 | — |
| MEHQ, gram | — | 0.020 | — | 0.020 | — | 0.020 | — | 0.020 |

The results indicate that BHT alone or in conjunction with erythorbate is not the preferred free radical scavenger for this application. That said, BHT does afford some free radical protection, and may also be useful for other reasons, as discussed above.

Although various embodiments have been shown and described, the present disclosure is not so limited and will be understood to include all such modifications and variations as would be apparent to one skilled in the art.

What is claimed is:

1. A method of servicing a well with a well servicing fluid having reduced polymer degradation, the method comprising:
   using a well servicing fluid formed prior to introduction into the well with components comprising at least one free radical scavenger, at least one polymer, erythorbate, and an aqueous based solvent including a brine having a density of about 8.4 pounds per gallon or more, the at least one free radical scavenger being selected from the group consisting of methyl ether hydroquinone, gallic acid, methyl gallate, and melatonin;
   introducing the well servicing fluid containing the free radical scavenger, polymer, and brine into the well; and
   reducing degradation of the polymer compared to the degradation that would occur for the same well servicing fluid without the free radical scavenger at the same temperature,
   with the proviso that the free radical scavenger is not erythorbate, lignin or lignin derivatives.

2. The method of claim 1, wherein the well servicing fluid has a molar ratio of erythorbate to free radical scavenger of 50:50 or greater.

3. The method of claim 1, further comprising positioning the well servicing fluid above a packer as a packer fluid and maintaining the position for a year or more at a temperature above 140° F.

4. The method of claim 1, wherein the at least one free radical scavenger is methyl ether hydroquinone.

5. The method of claim 1, wherein the at least one free radical scavenger is chosen from gallic acid, or methyl gallate.

6. The method of claim 1, wherein the at least one free radical scavenger is melatonin.

7. The method of claim 2, wherein the well servicing fluid has a molar ratio of erythorbate to free radical scavenger of from 50:50 to 80:20.

8. The method of claim 1, wherein the at least one polymer is a polysaccharide.

9. The method of claim 1, wherein the at least one polymer is chosen from viscosifying polymers, fluid loss control polymers, or polymers to control fluid friction flow.

10. A method of servicing a well with a well servicing fluid having reduced polymer degradation, the method comprising:
    using a well servicing fluid formed prior to introduction into the well with components comprising at least one free radical scavenger including methyl ether hydroquinone or melatonin, at least one polymer, erythorbate, and an aqueous based solvent; and
    introducing the well servicing fluid containing the free radical scavenger, polymer, and brine into the well; and
    reducing degradation of the polymer compared to the degradation that would occur for the same well servicing fluid without the free radical scavenger at the same temperature,
    with the proviso that the free radical scavenger is not erythorbate, lignin or lignin derivatives.

11. A method of servicing a well with a well servicing fluid having reduced polymer degradation, the method comprising:
    using a well servicing fluid formed prior to introduction into the well with components comprising at least one free radical scavenger including melatonin, at least one polymer, erythorbate, and an aqueous based solvent; and
    introducing the well servicing fluid containing the free radical scavenger, polymer, and brine into the well; and
    reducing degradation of the polymer compared to the degradation that would occur for the same well servicing fluid without the free radical scavenger at the same temperature,
    with the proviso that the free radical scavenger is not erythorbate, lignin or lignin derivatives.

12. The method of claim 9, wherein the at least one viscosifying, fluid loss control polymer or polymer to control fluid friction flow is chosen from block or random copolymers containing units selected from vinyl alcohol, acrylates, (meth)acrylates, pyrrolidone, 2-acrylamido-2-methylpropane sulfonate, acrylamides and (meth)acrylamides.

13. The method of claim 1, wherein the well servicing fluid further comprises lignin or lignin derivatives.

14. The method of claim 8, wherein the polysaccharide is chosen from guar gum, hydroxypropyl guar, carboxymethyl hydroxypropyl guar and its salts, hydroxyalkyl guar grafted with vinyl phosphonic acid and its salts, and guar grafted with vinyl phosphonic acid and its salts.

15. The method of claim 8, wherein the polysaccharide is chosen from natural gums or microbial polysaccharides.

16. The method of claim 8, wherein the polysaccharide is a starch or a starch derivative chosen from carboxymethyl starch, carboxyethyl starch, hydroxyalkyl starch, carboxyalkyl hydroxyalkyl starch, alkylcarboxyalkyl starch, alkylcarboxyalkyl hydroxyalkyl starch, methyl starch, ethyl starch, or propyl starch.

17. The method of claim 8, wherein the polysaccharide is a cellulose or cellulose derivative chosen from alkylcellulose, hydroxyalkyl cellulose, alkylhydroxyalkyl cellulose, carboxyalkyl cellulose derivatives, alkyl carboxyalkyl cellulose and alkyl carboxyalkyl hydroxyalkyl cellulose.

18. The method of claim 8, wherein the polysaccharide is a cellulose derivative chosen from methyl cellulose, ethyl cellulose, propyl cellulose, hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethyl cellulose, carboxymethyl cellulose and carboxymethyl hydroxyethyl cellulose or a hydroxyalkyl cellulose grafted with vinyl phosphonic acid or salt thereof.

19. The method of claim 8, wherein the polysaccharide is chosen from hydroxyethylcellulose grafted with vinyl phosphonic acid or its salts or hydroxypropylcellulose grafted with vinyl phosphonic acid or its salts.

20. The method of claim 1, wherein the at least one polymer is chosen from polyvinyl alcohols, polyimides, polyamines, quaternary polyamines, quaternary ammonium polymers, polyacrylates, polypyrrolidones and polyacrylamides.

21. The method of claim 3, wherein the well servicing fluid further comprises a polyol and a water-superabsorbent polymer and the method further comprises increasing the thermal insulation efficiency of the fluid compared to the efficiency for the same well servicing fluid without the polyol and water-superabsorbent polymer.

22. The method of claim 1, wherein the aqueous based solvent is a brine comprising a concentration of salt of 500 mg/L or more, based on the total volume of the brine.

23. The method of claim 22, wherein the salt for the aqueous based brine is selected from NaCl, KCl, $CaCl_2$, $MgCl_2$, $NH_4Cl$, KBr, $CaBr_2$, NaBr, $ZnBr_2$, or mixtures thereof.

24. The method of claim 22, wherein the aqueous based brine comprises an organic salt selected from sodium formate, potassium formate, cesium formate, sodium acetate, potassium acetate, cesium acetate, and mixtures thereof.

25. The method of claim 24, wherein the organic salt for the aqueous based brine is selected from sodium formate, potassium formate, cesium formate, sodium acetate, potassium acetate, cesium acetate, and mixtures thereof.

26. The method of claim 1, further comprising a polyol.

27. The method of claim 1, wherein the aqueous based solvent is a brine comprising a density greater than about 11.6 pounds per gallon.

28. The method of claim 1, wherein the concentration of brine in the well servicing fluid is about 50% by weight or more, based on the total weight of the well servicing fluid.

29. The method of claim 1, wherein the fluid is formulated with at least one additional compound chosen from non-emulsifiers, pH controller, crosslinkers, breakers, viscosifying agents, surfactants, clay stabilization additives, scale dissolvers, biopolymer degradation additives, fluid loss control additives, proppants, biocides, and high temperature stabilizers.

\* \* \* \* \*